United States Patent Office 3,100,203
Patented Aug. 6, 1963

3,100,203
DIALDEHYDE POLYSACCHARIDE-ACRYLAMIDE DERIVATIVES
Peter J. Borchert, Elkhart, Ind., assignor to Miles Laboratories, Inc., Elkhart, Ind., a corporation of Indiana
No Drawing. Filed May 6, 1960, Ser. No. 27,263
6 Claims. (Cl. 260—211)

This invention relates to derivatives of dialdehyde polysaccharides. In one of its more particular aspects, this invention relates to the preparation of acrylamidyl derivatives of dialdehyde polysaccharides. By acrylamidyl derivatives are meant dialdehyde polysaccharide derivatives in which one or both of the aldehyde groups of the polymeric unit of the polysaccharide has been replaced by a group of the formula:

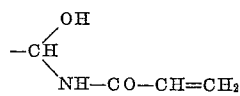

Dialdehyde polysaccharides are prepared by the oxidation of polysaccharides with materials such as periodic acid. They may be economically produced by the use of various processes including the electrolytic procedure disclosed in U.S. Patent No. 2,713,553 to Charles L. Mehltretter. The reaction of polysaccharides with periodic acid may be exemplified by the periodic acid oxidation of starch which is shown in the following equation:

(1)
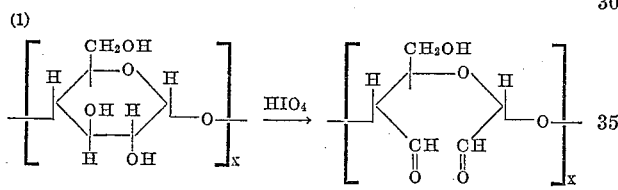

wherein $x$ stands for the number of repeating units in the molecule which may number from about 20 to as many as several thousand. Although Equation 1 shows that an anhydroglucose unit of the polysaccharide is oxidized to give the 2,3-dialdehyde derivative thereof and that this reaction presumably occurs throughout the polymer chain of the polysaccharide it should be pointed out that a wide range of dialdehyde polysaccharides are available having various degrees of oxidation. These dialdehyde polysaccharides may be slightly oxidized or nearly completely oxidized, or oxidized to various degrees between these extremes. The dialdehyde polysaccharides thus may be anywhere from about 10% to over 90% oxidized; that is, for each 100 anhydroglucose units of the polysaccharide from 10 to over 90 of these units may have been converted to the dialdehyde.

Dialdehyde polysaccharides find use in a number of applications in the paper, textile and leather industries, and in other industries as well. Because of the reactive aldehyde groups in dialdehyde polysaccharides they may be used in the preparation of new and useful polymeric compounds. In addition to starch other polysaccharides may be oxidized to form dialdehyde polysaccharides. Such compounds include celluloses, inulin, algins and the like.

It is an object of this invention to provide derivatives of dialdehyde polysaccharides which have desirable properties for use in a wide variety of applications.

Another object of this invention is to provide a product having a greater degree of functionality than the dialdehyde polysaccharides themselves.

A further object of this invention is to prepare derivatives of dialdehyde polysaccharides which are useful in various polymerization reactions.

Another object of this invention is to provide a process for preparing derivatives of dialdehyde polysaccharides wherein one or both of the aldehyde groups in the polymer unit is substituted with a polyfunctional radical.

Yet another object of this invention is to provide novel polymeric compounds which can be used in the formation of dispersions, gels and resins.

Other objects and advantages of this invention will become apparent in the course of the following detailed disclosure and description.

The present invention generally consists in the reaction of dialdehyde polysaccharides with acrylamide to form compounds in which the aldehyde groups of at least some of the polymer units of the dialdehyde polysaccharide are replaced by the acrylamidyl carbonyl addition product of the aldehyde. Both monoacrylamidyl addition products and diacrylamidyl derivatives may be prepared, that is, either or both of the aldehyde groups of the dialdehyde polysaccharide polymer unit may be reacted with acrylamide as shown in Equations 2 and 3 below:

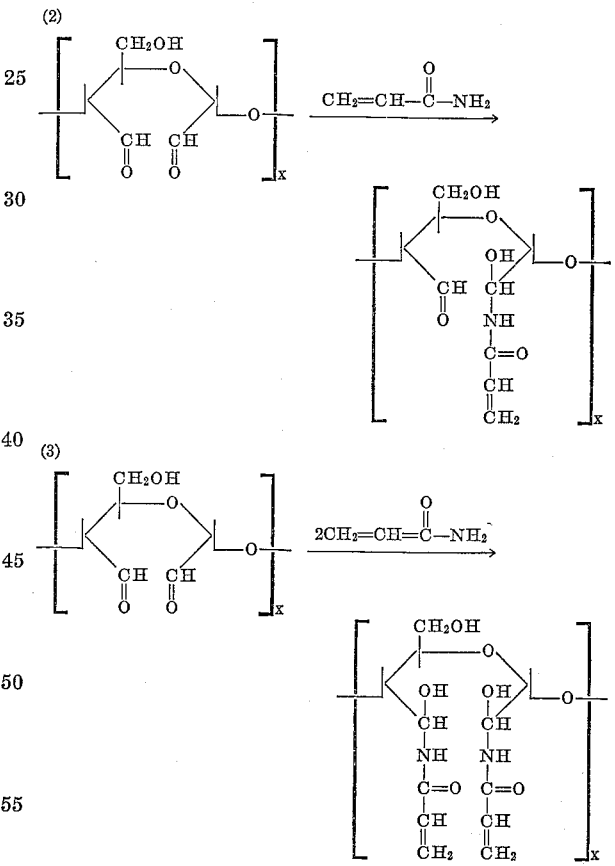

wherein $x$ has the same significance as above. The process for preparing these derivatives requires reacting from about 1.0 to 2.0 moles of acrylamide per polymer unit of dialdehyde polysaccharide in a suitable anhydrous or aqueous reaction medium and in the presence of an acidic catalyst.

Suitable reaction media which may be used for carrying out the process of this invention include lower aliphatic oxygen containing compounds such as alcohols and ethers. For example, lower alcohols such as methanol, propanols and butanols may be used as well as monoethers of ethylene glycol. Exemplary of this latter group are the monomethyl, monoethyl and monobutyl ethers of ethylene glycol. These organic systems may be used singly for reaction media or mixtures of these various solvents may be used. A mixture of ethylene glycol monomethyl ether with from about 5 to 30 parts by volume of water, for example, may be used for this purpose.

Any acidic catalyst which is effective to catalyze the reaction betwen the dialdehyde polysaccharide and acrylamide may be used. Sulfuric acid, including aqueous sulfuric acid of from about 40% to about 60% concentration has been found to be particularly advantageous in this regard. The acid is used in an amount of from about 1% to 5% by weight of the dialdehyde polysaccharide to obtain reaction products containing between about 1.0 and 2.0 moles of acrylamide per polymer unit of dialdehyde polysaccharide. Especially preferred is the use of from about 2% to 3% by weight of the dialdehyde polysaccharide. The concentration of the catalyst based upon the reaction medium is from about 0.1% to 1.0% by weight of the reaction mixture and preferably from about 0.3% to 0.7%.

The reaction between the dialdehyde polysaccharide and acrylamide is generally conducted at a temperature of from about 45° C. to 100° C. for a period long enough to insure complete reaction, for example, for a period of from about 1 to 3 hours. However, it is preferred to maintain the reaction mixture at a temperature in the range of from about 45° C. to 60° C. during the addition of catalyst.

The reaction can be carried out by contacting a slurry of the dialdehyde polysaccharide with a solution of acrylamide in the solvent medium being used in the presence of the acid catalyst. Most conveniently the catalyst is added to a vigorously stirred slurry of the dialdehyde polysaccharide in the solvent medium having the acrylamide dissolved therein.

For purposes of this invention the proportions of dialdehyde polysaccharide to acrylamide used are not critical, but the degree of modification of the dialdehyde polysaccharide in part depends upon this proportion. It should be understood, of course, that even where 1.0 mole of acrylamide per repeating dialdehyde polysaccharide unit is used, the number of added acrylamide molecules in different repeating units may vary. That is, it is possible to obtain diacrylamidyl derivatives as well as monoacrylamidyl derivatives of dialdehyde polysaccharides by using acrylamide in a proportion to yield 1.0 mole of acrylamide per repeating dialdehyde polysaccharide unit. However, the use of a greater quantity, in fact up to about 4.0 moles of acrylamide per polymer unit will insure that a greater number of the repeating units of the polymer are converted to the diacrylamidyl derivative. In another respect it is advantageous to use acrylamide in excess of the stoichiometrically required amount up to about twice the stoichiometric amount because of the possibility of the loss of some of the acrylamide in side reactions which may consume some of the acrylamide. For example, it is known that acrylamide is converted to the corresponding acrylate in the presence of alcohols in accordance with Equation 4, where the alcohol is represented as being methyl alcohol. Methyl acrylate is the product of this side reaction.

(4)

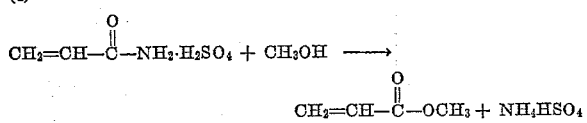

This side reaction has been observed to occur to a very small extent in carrying out the process of this invention. Use of an excess of acrylamide will insure recovery of the desired product, even though this side reaction does occur.

Another factor which will influence the type of product obtained in carrying out the process of this invention is the degree of oxidation of the dialdehyde polysaccharide starting material. As pointed out above, dialdehyde polysaccharides having a wide range of percentage of oxidation are available. For the purpose of this invention it is preferred to use dialdehyde polysaccharides which are relatively highly oxidized. In particular, dialdehyde polysaccharides having a degree of oxidation of upwards of about 70% have been found to produce products having the desired degree of modification.

Other factors affecting the degree of modification of dialdehyde polysaccharides are temperature, reaction time, and choice of reaction medium. With reaction media which have higher boiling points it is generally found that shorter contact times are sufficient for complete reaction, since the reaction may be conducted at a higher temperature. For example, in the case of products in which 1.0 mole of acrylamide per polymer unit of dialdehyde polysaccharide is reacted, use of a lower alcohol as the reaction medium requires a longer contact time than in the case where ethylene glycol monoethers are used. For instance, dialdehyde starch can be converted to the acrylamidyl derivative using methanol as the reaction medium with a contact time of 2 hours at 60° C. to 65° C. Ethylene glycol mono-methyl ether, having a much higher boiling point, may be used with a contact time of but one hour at a temperature of 80° C. to 90° C.

As pointed out above, both anhydrous and aqueous organic systems may be used as reaction media to carry out the process of this invention. In the case of the reaction of 1 mole of acrylamide per polymer unit of dialdehyde polysaccharide, it is preferred to utilize an anhydrous medium because the use of aqueous reaction media has certain disadvantages. In the first place the side reaction similar to that shown in Equation 4 is observed. This side reaction is a hydrolysis of acrylamide according to Equation 5.

(5)

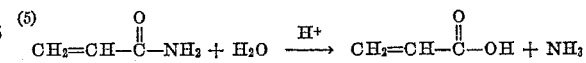

Not only does this side reaction occur where an aqueous reaction medium is used, but it is observed that this reaction occurs to a much greater extent than does the reaction shown in Equation 4 in the case of non-aqueous media. This is especially so at temperatures of above about 50° C. The occurrence of this side reaction results in considerable loss of acrylamide. In addition the ammonia formed has a tendency to effect partial decomposition of the dialdehyde polysaccharide being used and may also neutralize some of the acidic catalyst thus effecting a reduction in the overall rate of reaction of the dialdehyde polysaccharide and acrylamide. Another disadvantage inherent in the use of an aqueous reaction medium for conducting the 1 to 1 reaction of dialdehyde polysaccharides with acrylamide is the dispersing action of the aqueous reaction medium upon the dialdehyde polysaccharide, particularly at elevated temperatures such as at temperatures of from about 50° C. to 80° C. This dispersion effect of the reaction medium upon the dialdehyde polysaccharide reactant will decrease yields of the desired product and make separation by filtration thereof extremely difficult.

In the case of the reaction of dialdehyde polysaccharides with acrylamide in the ratio of 2 moles of acrylamide per polymer unit of dialdehyde polysaccharide, both anhydrous and aqueous organic reaction media may be used satisfactorily. Under anhydrous conditions reaction temperatures as high as from about 90° C. to 100° C. and contact times of about 3 hours are required. With aqueous media, for example, using about 5% to 30% by volume of water, temperatures as low as about 65° C. with contact times of from about 1 to 2 hours may be used effectively. In general, the temperature and time of reaction are directly dependent upon the choice of reaction medium.

The products of the process of this invention may be recovered by use of conventional techniques such as filtration, centrifugation, and the like. They are generally isolated as white or slightly yellow solids by direct filtration in yields of from about 95% to 100% of theory.

As stated above, the products of this invention have many applications. They may be used, for example, in the form of dispersions which may be readily prepared by mixing the acrylamidyl derivatives of this invention in suitable dispersing media, such as water or mixtures of organic solvents with water, preferably with the use of a salt solution to facilitate the dispersion of the acrylamidyl derivative in the dispersing medium. Salts which may be used for this purpose include sodium bicarbonate, disodium phosphate, sodium acetate, sodium formate, sodium bisulfite, and others of like nature. The resulting dispersions are useful in the paper, textile and leather-finishing industries in application as sizing agents, and in various other operations for the treatment of paper, textiles and leather.

The compounds of this invention are also capable of gel formation. While the products as such are insoluble in water at room temperature, heating the acrylamidyl derivatives of dialdehyde polysaccharides for short periods of time at temperatures in the range of, for example, from about 50° C. 90° C. in the presence of various salts causes the products to disperse or dissolve and results in the formation of heat-stable gels. Various salts may be used for this purpose, for example, sodium bicarbonate, sodium acetate, disodium phosphate and borax. The resulting gels, because they are stable to heat and do not redissolve in water, are useful in the photographic arts for the formulation of special emulsions for use in developing and printing. They also have utility in the paper and textile industries for special coatings and finishes.

Since the compounds of this invention are polymeric compounds with a high degree of functionality, this so-called "polyfunctionality" can be used to advantage. The polyfunctionality of these compounds is more evident in the case of the compounds where less than 2 moles of acrylamide per mole of dialdehyde polysaccharide polymer unit is reacted. In such cases the unreacted carbonyl groups of the polymer are capable of further carbonyl reactions and the double bond of the acrylamidyl grouping is capable of various addition reactions or polymerization reactions. For example, heating the products of this invention under pressure will result in their polymerization. They may also be caused to copolymerize with other monomers to form useful copolymers. The resulting polymers and copolymers are hard, thermosetting resins which may be used in coatings and in the fabrication of various plastic materials.

This invention will be better understood by reference to the following examples which are intended for purposes of illustration and are not to be construed as limiting the scope of this invention which is defined in the claims appended thereto.

*Example I*

A slurry was prepared by stirring a mixture of 24 g. (0.093 mole) of dialdehyde starch (73.3% oxidized, 14.7% moisture), 26.5 g. (0.372 mole) of acrylamide, 100 ml. of methanol and 1 ml. of 40% aqueous sulfuric acid. The slurry was heated with stirring on a water bath at 40° C. to 50° C. for 1 hour and then at 50° C. to 60° C. for another hour. The slurry was then cooled. The white precipitate which formed was removed by filtration, washed with 50 ml. of acetone and dried at 60° C. for 3 hours. A yield of 26 g. of product was obtained.

Calculated: N, 4.9% (for 1.0 mole of acrylamide per polymer unit of dialdehyde starch). Found: 5.9%.

The following example illustrates the preparation of an addition product of a dialdehyde polysaccharide with acrylamide wherein the ratio of acrylamide to dialdehyde polysaccharide is about 2 moles of acrylamide per polymer unit of dialdehyde polysaccharide.

*Example II*

A slurry was prepared using 24 g. (0.113 mole) of dialdehyde starch (75.3% oxidized), 33 g. (0.466 mole) of acrylamide and 100 ml. of n-butanol. This slurry was charged to a 500 ml. three-necked flask and heated with stirring at 50° C. One milliliter of 50% aqueous sulfuric acid was added to catalyze the reaction and the mixture was then heated at 90° C. for three hours. After cooling the reaction product was filtered, washed with 50 ml. of methanol and 50 ml. of acetone and dried in an oven at 75° C. for 2 to 3 hours. The yield of product containing 5.0% moisture as determined by the Karl Fischer method was 45 g.

Calculated: N, 7.6% (for 2 moles of acrylamide per polymer unit of dialdehyde starch). Found: 7.8%.

The following example illustrates the use of a dialdehyde polysaccharide having a higher degree of oxidation.

*Example III*

A slurry was prepared from 30 g. (0.166 mole) of dialdehyde starch (94% oxidized, 5.5% moisture), 47.2 g. (0.664 mole) of acrylamide and 200 ml. of ethylene glycol monomethyl ether. The resulting slurry was treated as described in Example II using 1 ml. of 40% aqueous sulfuric acid as the catalyst. Yield: 40 g. Moisture: 5.9%.

Calculated: N, 5.5% (for 1 mole of acrylamide per polymer unit of dialdehyde starch). Found: 5.7%.

The following example illustrates the use of a more highly oxidized dialdehyde polysaccharide and an aqueous reaction medium in the preparation of an addition product of a dialdehyde polysaccharide and acrylamide in which 2 moles of acrylamide per polymer unit of dialdehyde polysaccharide are reacted.

*Example IV*

A slurry was made up from 30 g. (0.166 mole) of dialdehyde starch (94% oxidized, 5.5% moisture), 47.2 g. (0.664 mole) of acrylamide, 240 ml. of ethylene glycol monomethyl ether, and 20 ml. of water. The resulting slurry was charged to a 500 ml. three-necked flask and heated with stirring at 65° C. One milliliter of 40% aqueous sulfuric acid was added which initiated an exothermic reaction. After reaching a temperature of 80° C. to 90° C. the volume of solids expanded. After 30 minutes the reaction mixture was cooled, filtered, washed with 50 ml. of acetone and dried in a vacuum oven for 15 hours. Yield: 53.5 g. Moisture: 4.1%.

Calculated: N, 8.6% (for 2 moles of acrylamide per polymer unit of dialdehyde starch). Found: 7.8%.

These data show that where an aqueous solvent system for conducting the reaction between the dialdehyde polysaccharide and acrylamide is used a satisfactory yield and analysis are obtained.

The following example illustrates the preparation of a reaction product in which the ratio of acrylamide to dialdehyde polysaccharide is about two moles of acrylamide per polymer unit of dialdehyde polysaccharide and in which another aqueous reaction medium is used.

*Example V*

A slurry was prepared using 30 g. (0.166 mole) of dialdehyde starch (94% oxidized, 5.5% moisture), 29.5 g. (0.415 mole) of acrylamide, 200 ml. of ethylene glycol monobutyl ether and 40 ml. of water. The resulting slurry was charged to a 500 ml. three-necked flask and heated with stirring to 45° C. One ml. of 40% aqueous sulfuric acid was then added to catalyze the reaction. The temperature increased to 65° C. The dialdehyde starch swelled slightly and the mixture became voluminous. After 1.5 hours it was cooled, filtered and washed with 100 ml. of acetone. The product, a slightly yellow solid, was dried in a vacuum oven for 15 hours at 60° C. Yield: 57.2 g. Moisture: 5.0%.

Calculated: N, 8.6% (for 2 moles of acrylamide per polymer unit of dialdehyde starch). Found: 7.8%.

In summary this invention concerns the preparation of derivaties of dialdehyde polysaccharides in which one or both of the aldehyde groups of the polymer units of the dialdehyde polysaccharide has been converted to an acrylamidyl carbonyl addition product of the dialdehyde polysaccharide. These compounds are capable of a wide variety of uses in the form of dispersions, gels and solid resins.

What is claimed is:

1. A dialdehyde polysaccharide derivative wherein at least some of the aldehyde groups of the polymer units of said dialdehyde polysaccharide have been replaced by groups having the formula:

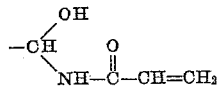

2. A compound according to claim 1 wherein said dialdehyde polysaccharide is dialdehyde starch in which from about 70 to more than 90 polymer units per 100 polymer units of starch have been converted to the dialdehyde.

3. A process for the preparation of an acrylamidyl derivative of a dialdehyde polysaccharide wherein at least some of the aldehyde groups of the polymer units of said dialdehyde polysaccharide have been replaced by groups having the formula:

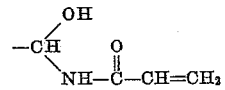

which comprises reacting a dialdehyde polysaccharide with from about 1.0 to 4.0 moles of acrylamide per polymer unit of said dialdehyde polysaccharide in a suitable solvent for said acrylamide and in the presence of an acidic catalyst at a temperature of from about 45° C. to 100° C. and recovering the resulting solid product.

4. A process according to claim 3 wherein the acrylamide is used as a solution in a solvent selected from the group consisting of lower aliphatic alcohols, lower aliphatic ethers of ethylene glycol and mixtures of said alcohols and ethers with water.

5. A process according to claim 3 wherein the acidic catalyst is sulfuric acid present in a concentration of from about 1% to 5% by weight of the dialdehyde polysaccharide.

6. A process according to claim 3 wherein the dialdehyde polysaccharide is dialdehyde starch.

References Cited in the file of this patent
UNITED STATES PATENTS

| | | |
|---|---|---|
| 2,764,503 | Jacobson | Sept. 25, 1956 |
| 2,885,394 | Barry | May 5, 1959 |